Figure 1:
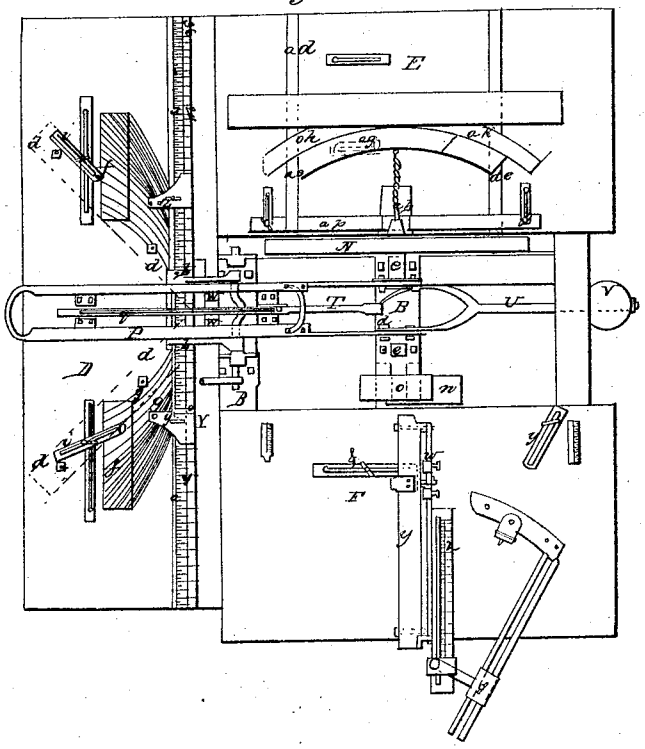
Figure 4:
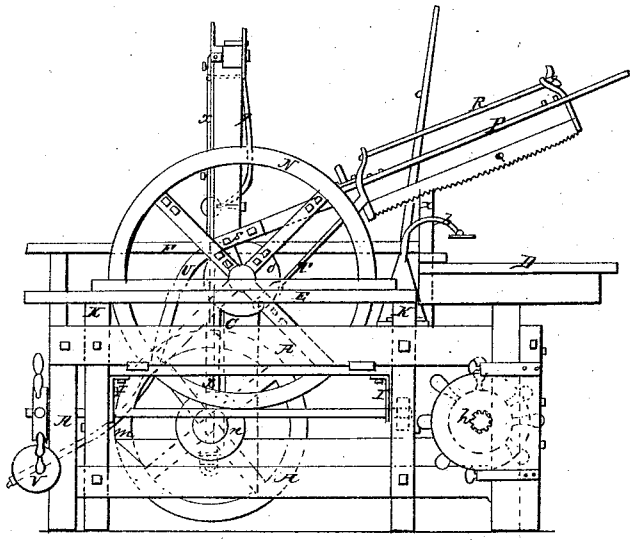
Figure 3:
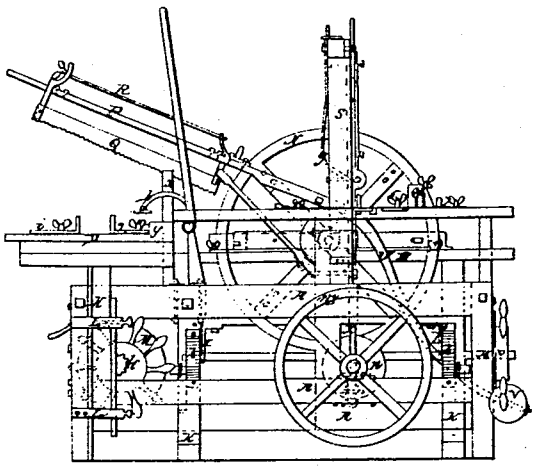
Figure 2:
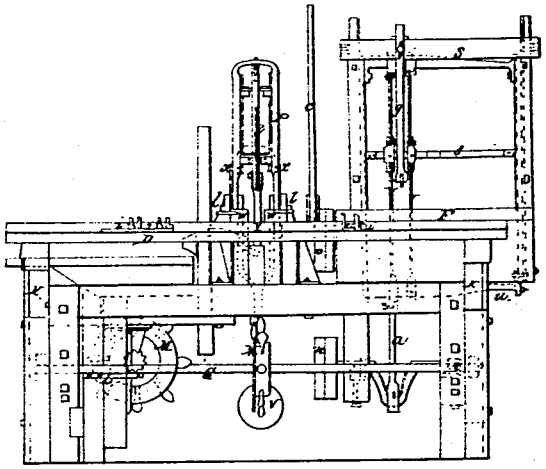
Figure 6:
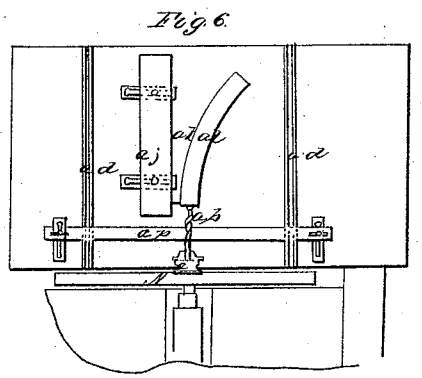
Figure 7:
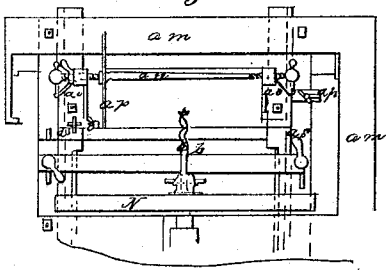
Figure 5:
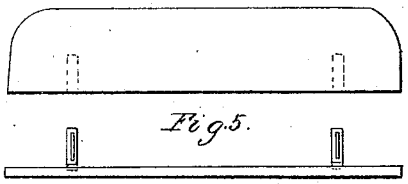
Figure 3:
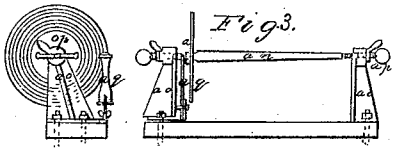

7560X

Sheet 1-3 Sheets.

J. Hamilton,

Making Fellies.

Patented Apr. 29, 1833.

AM. PHOTO-LITHO. CO. N.Y. (OSBORNE'S PROCESS.)

7560X

Sheet 2 · 3 Sheets.

J. Hamilton,

Making Fellies,

Patented Apr. 29. 1833.

AM PHOTO-LITHO CO N Y. (OSBORNE'S PROCESS)

7560X

Sheet 3-3 Sheets.

J. Hamilton,

Making Fellies.

Patented Apr. 29, 1833.

AM. PHOTO-LITHO. CO. N.Y. (OSBORNE'S PROCESS)